United States Patent [19]

Sakamoto et al.

[11] 4,068,541
[45] Jan. 17, 1978

[54] BANJO-SHAPED AXLE CASING

[75] Inventors: Masao Sakamoto; Ryoichi Okuda; Hitoshi Saito; Kenzi Sasazaki, all of Toyota, Japan

[73] Assignee: Toyota Jidosha Kogyo Kabushiki Kaisha, Toyota, Japan

[21] Appl. No.: 709,804

[22] Filed: July 29, 1976

[30] Foreign Application Priority Data

Dec. 11, 1975 Japan .................................. 50-167557

[51] Int. Cl.² ............................................ F16H 57/02
[52] U.S. Cl. ................................... 74/607; 74/606 R
[58] Field of Search ...................... 74/606 R, 607, 710, 74/710.5, 711, 713

[56] References Cited

U.S. PATENT DOCUMENTS

| 2,578,155 | 12/1951 | Slider | 74/713 |
| 3,118,515 | 1/1964 | Kraus et al. | 74/713 |
| 3,138,970 | 6/1964 | Costa et al. | 74/711 |

Primary Examiner—Stephen C. Bentley
Attorney, Agent, or Firm—Koda and Androlia

[57] ABSTRACT

A banjo-shaped axle casing including a differential housing and a pair of axle housings. The axle casing has at least a pair of mounting members disposed opposite each other on the inside surface of the axle casing. At least one pair of flexible partitions are inserted into the axle casing such that they engage with the mounting members and partition the axle housings from the differential housing.

6 Claims, 7 Drawing Figures

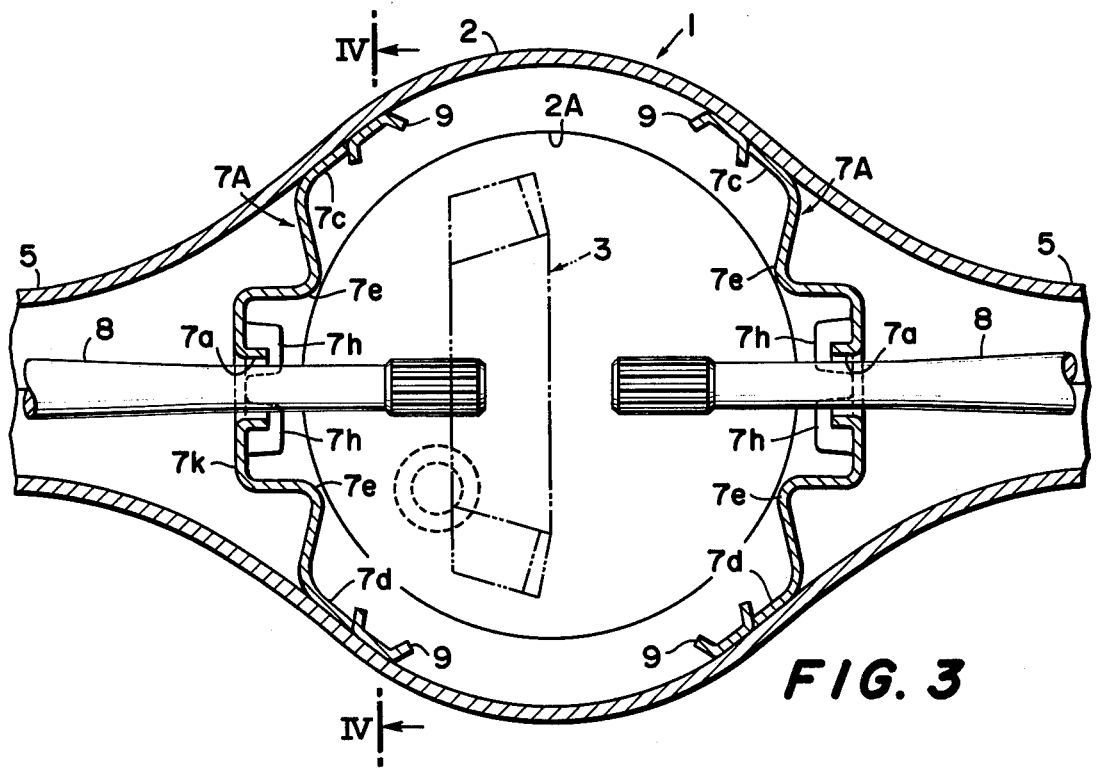
FIG. 3
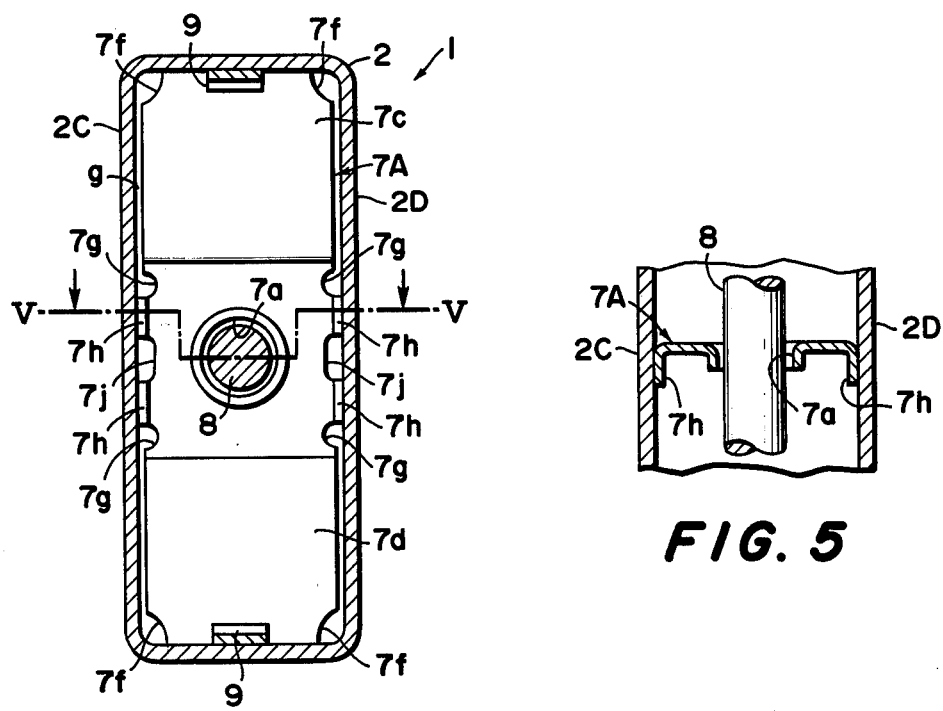
FIG. 4
FIG. 5

4,068,541

BANJO-SHAPED AXLE CASING

BACKGROUND OF THE INVENTION

1. Field of the Invention

The present invention relates to axle casings used in rear axles and more particularly to axle casings used in automobiles and the like.

2. Prior Art

The banjo-shaped axle casing is well known in the art and comprises a substantially disc shaped differential housing and a pair of cylindrical axle housings which project and extend collinearly and outwardly from the outer circumference of the differential housing. Lubricating oil is stored within the differential housing to a level such that the lower portion of the differential gear is constantly submerged in oil.

In the prior art banjo-shaped axle casings, when a horizontal inertial force is applied to the automobile, the lubricating oil within the differential housing flows out from the housing and into the axle housing, causing the differential gear to become insufficiently lubricated. In order to avoid this risk, the prior art banjo-shaped axle casings are provided with a pair of partitions inside the differential housing so as to prevent the lubricant from flowing into the axle housing in large amounts when a horizontal inertial force acts upon the automobile. Each of the partitions has a hole disposed at the center thereof for passing the axle therethrough. In addition, a plurality of small holes or slits are disposed about the rim of the outer circumference of the partition. The partitions are fixed, at the rim of the outer circumference, to the inside wall of the axle casing by welding. The aforementioned small holes and/or slits are provided so as to permit the lubricant which has flowed into the axle housings to return to the differential housing therethrough.

To make a rear axle assembly employing the prior art banjo-shaped axle casing as described hereinabove, (i) the axle casing is made by welding (the method of producing the axle casing itself is well known in the art and therefore will not be discussed herein); (ii) the partitions are inserted into the axle casing through a cap opening provided at the front of the differential housing; (iii) each partition is positioned at a predetermined position; (iv) the rim of the outer circumference thereof is welded to the inside wall of the axle casings; and (v) the inside of axle casing is cleansed.

The prior art banjo-shaped axle casings manufactured according to the above described process steps has the following shortcomings:

1. Since the positioning of the partitions as well as the welding of the partitions to the inside wall of the axle casings must be done in a dark, confined space of the axle casing, the accuracy and efficiency of the operations are adversely affected.

2. Scales and other particles that peel off from the welded portion and the inside wall of the axle casing during the welding operation and subsequent cleansing operations, clog up the small holes in the partitions and prevent the lubricating oil from flowing back into the differential housing during operation thereby resulting in an oil deficient differential and early differential failure. Moreover, scales and the like may cause damage to the differential gear.

The present invention solves these drawbacks and provides an improved banjo-shaped axle casing which is simple to make and whose differential is free from the risk of being insufficiently lubricated.

SUMMARY OF THE INVENTION

Accordingly, it is a general object of the present invention to provide a banjo-shaped axle casing wherein the installation of the partitions is made easier.

It is another object of the present invention to provide a banjo-shaped axle casing wherein the holes in the partitions are not clogged up from scale and other particles as a result of the assembly operation.

It is still another object of the present invention to provide an axle casing wherein the probabilities of damage to the differential gear are reduced.

In keeping with the principles of the present invention, the objects are accomplished by a unique banjo-shaped axle casing including a differential housing and a pair of axle housings coupled to the differential housing opposite each other. Within the axle casing at least a pair of mounting members are provided opposite each other on the inside surface of the axle casing. The mounting members are provided on the inside surface of the axle casing by welding them to the axle casing and then thoroughly cleaning the axle casing. A pair of flexible partitions are inserted into the axle casing such that they engage with the mounting members and partition the differential housing from the axle housings thereby preventing large amounts of oil from flowing into the axle housings during applications of a horizontal inertial force.

BRIEF DESCRIPTION OF THE DRAWINGS

The above-mentioned and other features and objects of the present invention will become more apparent by reference to the following description taken in conjunction with the accompanying drawings, wherein like reference numerals denote like elements, and in which:

FIG. 3 is a vertical cross section of a banjo-shaped axle casing in accordance with the teachings of the present invention;

FIG. 4 is a cross sectional view of the embodiment of FIG. 3 taken along the lines IV — IV;

FIG. 5 is a cross sectional view of the embodiment of FIG. 4 taken along the lines V — V;

DETAILED DESCRIPTION OF THE INVENTION

The preferred embodiment of the present invention will be described hereinbelow in conjunction with the accompanying drawings. First, however, the prior art banjo-shaped axle casing structure will be briefly described by referring to FIGS. 1 and 2.

Figure 1:
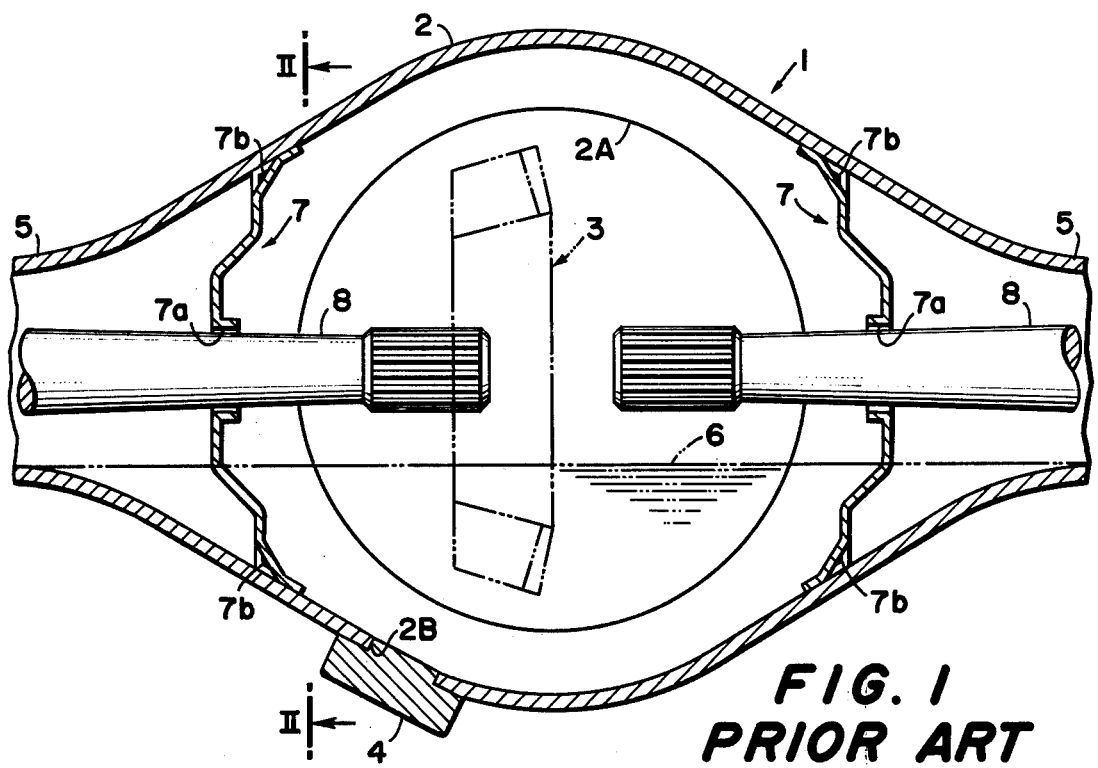
FIG. 1 is an enlarged vertical cross sectional view of a prior art banjo-shaped axle casing showing the principal elements thereof.
Figure 2:
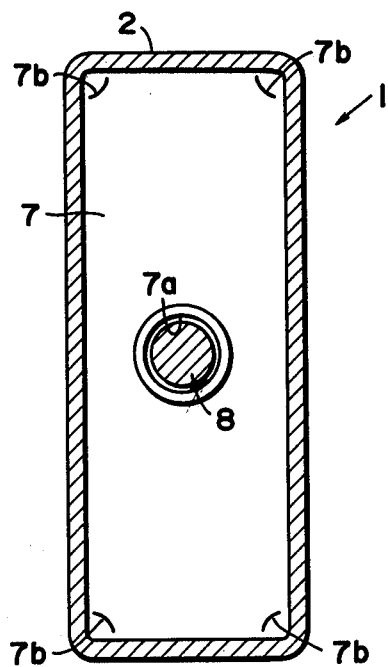
FIG. 2 is a cross section along the lines II — II of FIG. 1.

The banjo-shaped axle casing of FIG. 1 includes a disc shaped differential housing 2 containing a differential gear 3 therein. In the front surface of differential housing 2 is provided an opening 2A which is closed with a cap (not shown). A hole 2B is provided in the bottom of housing 2 for the purpose of changing the lubricating oil 6. Hole 2B is closed by a plug 4. A pair of cylindrical axle housings 5 extend collinearly outwardly from the outer circumference of housing 2. Axles 8 which are driven by the differential 3 (only the ring gear is shown here) are contained within the axle housings 5. Inside differential housing 2 is provided a pair of partitions 7 partitioning the axle housings 5 from differential housing 2. As shown in FIGS. 1 and 2, each partition 7 has an axle opening 7a provided in the center thereof, as well as a plurality of small holes 7b. Partitions 7 are made from steel plate and have a rectangular shape substantially corresponding to the vertical cross section of the axle casing. The small holes 7b are provided for the purpose of allowing the oil that flows into axle housings 5 to flow back into differential housing 2.

To install the partitions in the prior art banjo-shaped axle casing, the partitions 7 are inserted into the differential housing 2 through the opening 2A. The partitions 7 are then positioned at predetermined positions and fixed at the rim of the circumference of partitions 7 to the inner surface of the axle casing by welding. After the partitions are installed, the welded portions as well as the inside of the axial casing are thoroughly cleansed. At the time of cleansing, scales and the like that peel off the welded portions and the axle casing interior are likely to clog up small holes 7b of partitions 7 unless great care and thoroughness is exercised. If small holes 7b are allowed to be clogged up, insufficient lubrication of the differential gear will result and an increased danger while driving the automobile will exist.

The objects of the present invention is to provide an improved banjo-shaped axle casing wherein the installation of the partitions is made easier and wherein the aforementioned dangers are eliminated. According to the present invention, improvement and the installation efficiency with respect to partitions and prevention of mal-lubrication of the differential gear are substantially, simultaneously accomplished.

The presently preferred embodiment of the present invention is described hereinbelow by reference to FIGS. 3 – 7. Those elements shown in each of the figures that are identical to those in FIGS. 1 and 2 are denoted by like numerals. Therefore, a detailed description of those numerals will not be given unless otherwise indicated.

Referring to FIG. 3, shown therein is a first embodiment of a banjo-shaped axle casing in accordance with the teachings of the present invention. In the axle casing 1 of FIG. 3, a plurality of mounting pieces 9 are provided at a plurality of locations abut the inside of the axle casing 1. Mounting pieces 9 are fixed to the inside surface of axle casing 1 at predetermined positions by means of, for example, welding, at the same time the axle casing is fabricated. The upper end 7c and the lower end 7d of partitions 7A are bent so as to provide sufficient contact with the inside surface of the axle casing. In addition, to give resiliency and enable upper and lower ends 7c and 7d to expand outwardly, a bent portion 7e is formed next to a hub 7k where axle hole 7a is provided.

As shown in FIG. 4 the partitions 7A have a plan view substantially rectangular in shape corresponding to the vertical cross section of the axle casing. Each partition 7A also has a slit 7f in each of the four corners to allow the lubricant to flow back into the differential housing. A pair of slits 7g disposed at the edge of each side of partition 7A, a pair of ears 7h is provided between slits 7g, and a slit 7j provided between ears 7h all allow the lubricant to flow back into the differential housing. As shown in FIG. 5, ears 7h are bent perpendicular with respect to the partition and are in forceable contact with the forward wall 2C and the rear wall 2D of differential housing 2 by their own outwardly expansive spring action.

A space g is provided between the inside wall of the axle casing and the edge of partitions 7a except at the places where ears 7h are located such that the disposition of the partitions 7A into the axle casing interior is made easier as described hereinafter. The upper and lower slits 7g are located on the side of the aforementioned bend 7e (FIG. 3). The slits 7g enable the upper end 7c and the lower end 7d of partitions 7A to bend toward each other.

To install the partitions 7A having the above described structure in the axle casing interior, partitions 7A are inserted through opening 2A provided in the front surface of differential housing 2 of the axle casing. In FIG. 3, the left hand partition is pushed to the left and the right hand partition is pushed to the right. At this point, each of the partitions 7A is obstructed by mounting pieces 9 that are fixed within the axle casing. Further pressing of the partitions causes the upper and lower ends 7c and 7d to bend and jump over the bonding pieces 9 and expand outwardly against the inside surface of axle housing 5. Immediately thereafter, upper and lower ends 7c and 7d by their own resiliency are forcefully pressed against both the bonding pieces 9 and the inside surface of the axle casing thereby firmly fixing the partitions 7A in the axle casing interior.

So long as the partitions 7A are held within the axle casing by means of the resilient characteristics of the partition, variations in the coupling structure utilizing the principles of the present invention are within the spirit and scope of this invention.

Figure 6:
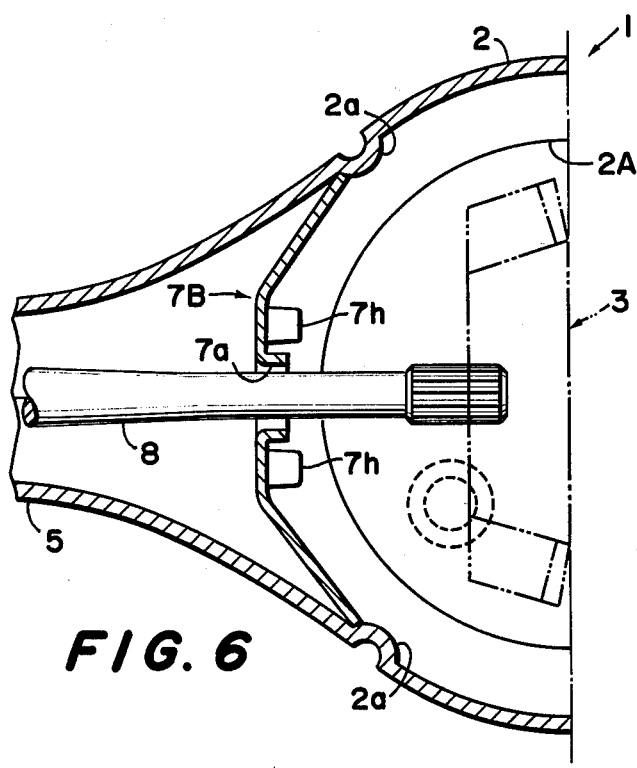
FIG. 6 is a half vertical cross sectional view of a second embodiment in accordance with the teachings of the present invention.

Referring to FIG. 6 shown therein is a second embodiment of an axle casing in accordance with the teachings of the present invention. In the axle casing of FIG. 6, the shape of the partition 7B is simpler than that of the first embodiment. Moreover, the novel feature characterizing this second embodiment is that the axle casing has mounting projections 2a formed in the axle casing during the fabricating process. In this embodiment, there is no requirement for mounting pieces 9 to be installed during fabrication of the casing as was done in the first embodiment. Since mounting projections 2a shown in FIG. 6 are formed simultaneously with the pressing process of the axle casing, far fewer production steps are involved and the elimination of the mounting pieces 9 results in a reduction in the manufacturing costs.

Figure 7:
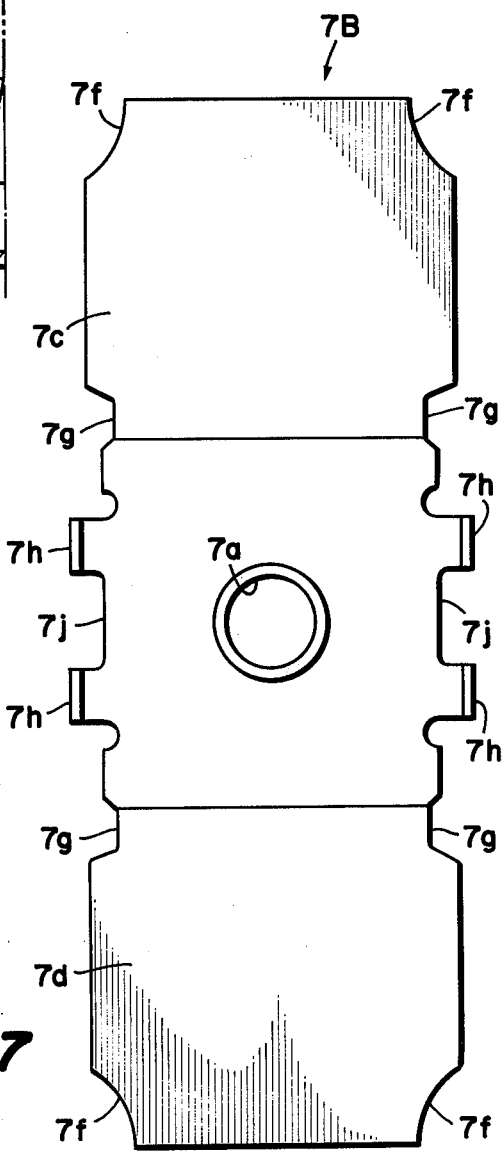
FIG. 7 is a plan view of the partition utilized in the second embodiment of FIG. 6.

FIG. 7 shows an enlarged plan view of the partitions 7B of FIG. 6. Like the partitions 7A shown in FIG. 3, partitions 7B has, at each side thereof, a pair of ears 7h, upper and lower ends 7c and 7d. Furthermore, the partitions 7B includes a hole 7a for the axle to project through and cutouts 7f and 7g. The partitions 7B is far simpler than the partitions 7A and is formed by only bending the metal twice at bends 7m.

To install the partitions 7B having the above described structure in the axle casing interior, partitions 7B are inserted through the opening 2A provided in the front surface of differential housing 2 in the axle casing. The left hand partition is pushed to the left and the right hand partition is pushed into the right. At some point, each of the partitions 7B is obstructed by the mounting projections 2a which are formed in the axle casing.

Further pressing of the partitions causes the upper and lower ends 7d and 7c to bend and jump over the mounting projections 2a formed in the axle casing. Immediately thereafter, the upper and lower ends 7c and 7d by their own resiliency are forcefully pressed against both the mounting projections 2a and the inside surface of the axle casing thereby fixing the partition 7B to the axle casing interior.

Since the partitions 7B in the second embodiment shown in FIG. 6 have a simpler shape than that in the first embodiment, not only is the cost of processing reduced but the risk of damage to the partitions caused by stress concentrations is lessened.

According to the axle casing of the present invention, as described hereinabove, the partitions are held within the casing by the elastic properties of the partition thereby reducing the number of processing steps during the rear axle assembly. Moreover, scales and the like are not found in the axle casing and accordingly will not cause an oil deficiency in the differential gear.

In all cases it is understood that the above described embodiments are merely illustrative of but a few of the many possible specific embodiments which can represent applications of the principles of the present invention. Numerous and varied other arrangements can be readily devised in accordance with these principles by those skilled in the art without departing from the spirit and scope of the invention.

We claim:

1. A banjo-shaped axle casing of the type including a differential housing and a pair of axle housings coupled to said differential housing comprising:

at least one pair of mounting members provided on the inside surface and on each side of the axle casing and opposite each other; and at least one pair of flexible partitions inserted into the axle casing, said flexible partition being inserted into the axle casing such that they engage with the mounting members and partition the differential housing from the axle housing thereby preventing large amounts of oil from flowing into said axle housing during applications of a horizontal inertial force.

2. The banjo-shaped axle casing according to claim 1 wherein the partitions are provided with holes to allow oil to flow into said differential housing from said axle housings.

3. The banjo-shaped axle casing according to claim 2 wherein said mounting members comprise pieces of metal welded to the inside surface of the axle casing.

4. The banjo-shaped axle casing according to claim 2 wherein the mounting members comprise mounting projections formed in the axle casing during fabrication of the axle casing.

5. The banjo-shaped axle casing according to claim 2 wherein said partitions have an axle hole for an axle to project through.

6. The banjo-shaped axle casing according to claim 4 wherein each of said partitions comprises a plate of flexible metal which in plan view is of substantially rectangular shape corresponding to a vertical cross section of said axle casing and which is bent in two places to divide the rectangle into three portions.

* * * * *